United States Patent
Balasubramanian et al.

(10) Patent No.: US 12,164,915 B2
(45) Date of Patent: Dec. 10, 2024

(54) METHODS AND SYSTEMS TO CLASSIFY SOFTWARE COMPONENTS BASED ON MULTIPLE INFORMATION SOURCES

(71) Applicant: Open Weaver Inc., Miami, FL (US)

(72) Inventors: Ashok Balasubramanian, Chennai (IN); Karthikeyan Krishnaswamy Raja, Chennai (IN); Arul Reagan S, Chengalpattu District (IN)

(73) Assignee: Open Weaver Inc., Miami, FL (US)

( * ) Notice: Subject to any disclaimer, the term of this patent is extended or adjusted under 35 U.S.C. 154(b) by 209 days.

(21) Appl. No.: 17/680,894

(22) Filed: Feb. 25, 2022

(65) Prior Publication Data

US 2022/0291921 A1    Sep. 15, 2022

Related U.S. Application Data (60) Provisional application No. 63/154,381, filed on Feb. 26, 2021.

(51) Int. Cl.
*G06F 8/73* (2018.01)
*G06F 8/10* (2018.01)
*G06N 20/00* (2019.01)

(52) U.S. Cl.
CPC .............. *G06F 8/73* (2013.01); *G06F 8/10* (2013.01); *G06N 20/00* (2019.01)

(58) Field of Classification Search
CPC .............. G06F 8/10; G06F 8/73; G06N 20/00
See application file for complete search history.

(56) References Cited

U.S. PATENT DOCUMENTS

| | | | |
|---|---|---|---|
| 5,953,526 A | 9/1999 | Day et al. | |
| 7,322,024 B2 | 1/2008 | Carlson et al. | |
| 7,703,070 B2 | 4/2010 | Bisceglia | |
| 7,774,288 B2 | 8/2010 | Acharya et al. | |

(Continued)

FOREIGN PATENT DOCUMENTS

| | | |
|---|---|---|
| CN | 108052442 A | 5/2018 |
| KR | 10-2020-0062917 | 6/2020 |

(Continued)

OTHER PUBLICATIONS

Chung-Yang et al. "Toward Singe-Source Of Software Project Documented Contents: A Preliminary Study", [Online], [Retrieve from INternet on Sep. 28, 2024], <https://www.proquest.com/openview/c15dc8b34c7da061fd3ea39f1875d8e9/1?pq-origsite=gscholar&cbl=237699> (Year: 2011).*

(Continued)

*Primary Examiner* — Ziaul A Chowdhury
(74) *Attorney, Agent, or Firm* — Foley & Lardner LLP (57) ABSTRACT

Systems and methods classifying software components based on multiple information sources are provided. An exemplary method includes retrieving a number of sources including a project documentation file, source code, and dependent project list associated with a software component, extracting a number of entities from the number of sources, processing the number of entities based on a machine learning model, mapping the number of entities to a set of rules, generating a number of categorizations based on the mapping of the number of entities to the set of rules, and ranking the number of categorizations based on the set of rules.

14 Claims, 7 Drawing Sheets

(56) References Cited

U.S. PATENT DOCUMENTS

| | | |
|---|---|---|
| 7,958,493 B2 | 6/2011 | Lindsey et al. |
| 8,010,539 B2 | 8/2011 | Blair-Goldensohn et al. |
| 8,051,332 B2 | 11/2011 | Zakonov et al. |
| 8,112,738 B2 | 2/2012 | Pohl et al. |
| 8,112,744 B2 | 2/2012 | Geisinger |
| 8,219,557 B2 | 7/2012 | Grefenstette et al. |
| 8,296,311 B2 | 10/2012 | Rapp et al. |
| 8,412,813 B2 | 4/2013 | Carlson et al. |
| 8,417,713 B1 | 4/2013 | Blair-Goldensohn et al. |
| 8,452,742 B2 | 5/2013 | Hashimoto et al. |
| 8,463,595 B1 | 6/2013 | Rehling et al. |
| 8,498,974 B1 | 7/2013 | Kim et al. |
| 8,627,270 B2 | 1/2014 | Fox et al. |
| 8,677,320 B2 | 3/2014 | Wilson et al. |
| 8,688,676 B2 | 4/2014 | Rush et al. |
| 8,838,606 B1 | 9/2014 | Cormack et al. |
| 8,838,633 B2 | 9/2014 | Dhillon et al. |
| 8,935,192 B1 | 1/2015 | Ventilla et al. |
| 8,943,039 B1 | 1/2015 | Grieselhuber et al. |
| 9,015,730 B1 | 4/2015 | Allen et al. |
| 9,043,753 B2 | 5/2015 | Fox et al. |
| 9,047,283 B1 | 6/2015 | Zhang et al. |
| 9,135,665 B2 | 9/2015 | England et al. |
| 9,176,729 B2 | 11/2015 | Mockus et al. |
| 9,201,931 B2 | 12/2015 | Lightner et al. |
| 9,268,805 B2 | 2/2016 | Crossley et al. |
| 9,330,174 B1 | 5/2016 | Zhang |
| 9,361,294 B2 | 6/2016 | Smith |
| 9,390,268 B1 | 7/2016 | Martini et al. |
| 9,471,559 B2 | 10/2016 | Castelli et al. |
| 9,558,098 B1 | 1/2017 | Alshayeb et al. |
| 9,589,250 B2 | 3/2017 | Palanisamy et al. |
| 9,626,164 B1 | 4/2017 | Fuchs |
| 9,672,554 B2 | 6/2017 | Dumon et al. |
| 9,977,656 B1 | 5/2018 | Mannopantar et al. |
| 10,305,758 B1 | 5/2019 | Bhide et al. |
| 10,474,509 B1 | 11/2019 | Dube et al. |
| 10,484,429 B1 | 11/2019 | Fawcett et al. |
| 10,761,839 B1 | 9/2020 | Migoya et al. |
| 10,922,740 B2 | 2/2021 | Gupta et al. |
| 11,023,210 B2 | 6/2021 | Li et al. |
| 11,238,027 B2 | 2/2022 | Frost et al. |
| 11,256,484 B2 | 2/2022 | Nikumb et al. |
| 11,288,167 B2 | 3/2022 | Vaughan |
| 11,294,984 B2 | 4/2022 | Kittur et al. |
| 11,295,375 B1 | 4/2022 | Chitrapura et al. |
| 11,301,631 B1 | 4/2022 | Atallah et al. |
| 11,334,351 B1* | 5/2022 | Pandurangarao .... G06Q 10/067 |
| 11,461,093 B1 | 10/2022 | Edminster et al. |
| 11,474,817 B2 | 10/2022 | Sousa et al. |
| 11,704,406 B2 | 7/2023 | Lee et al. |
| 11,893,117 B2 | 2/2024 | Segal et al. |
| 11,966,446 B2 | 4/2024 | Socher et al. |
| 12,034,754 B2 | 7/2024 | O'Hearn et al. |
| 2001/0054054 A1 | 12/2001 | Olson |
| 2002/0059204 A1 | 5/2002 | Harris |
| 2002/0099694 A1 | 7/2002 | Diamond et al. |
| 2002/0150966 A1 | 10/2002 | Muraca |
| 2002/0194578 A1 | 12/2002 | Irie et al. |
| 2004/0243568 A1 | 12/2004 | Wang et al. |
| 2006/0090077 A1 | 4/2006 | Little et al. |
| 2006/0104515 A1 | 5/2006 | King et al. |
| 2006/0200741 A1 | 9/2006 | Demesa et al. |
| 2006/0265232 A1 | 11/2006 | Katariya et al. |
| 2007/0050343 A1 | 3/2007 | Siddaramappa et al. |
| 2007/0168946 A1 | 7/2007 | Drissi et al. |
| 2007/0185860 A1 | 8/2007 | Lissack |
| 2007/0234291 A1 | 10/2007 | Ronen et al. |
| 2007/0299825 A1 | 12/2007 | Rush et al. |
| 2009/0043612 A1 | 2/2009 | Szela et al. |
| 2009/0319342 A1 | 12/2009 | Shilman et al. |
| 2010/0106705 A1 | 4/2010 | Rush et al. |
| 2010/0121857 A1 | 5/2010 | Elmore et al. |
| 2010/0122233 A1* | 5/2010 | Rath .................. G06F 8/10 |
| | | 717/105 |
| 2010/0174670 A1 | 7/2010 | Malik et al. |
| 2010/0205198 A1 | 8/2010 | Mishne et al. |
| 2010/0205663 A1 | 8/2010 | Ward et al. |
| 2010/0262454 A1 | 10/2010 | Sommer et al. |
| 2011/0231817 A1 | 9/2011 | Hadar et al. |
| 2012/0143879 A1 | 6/2012 | Stoitsev |
| 2012/0259882 A1 | 10/2012 | Thakur et al. |
| 2012/0278064 A1 | 11/2012 | Leary et al. |
| 2013/0103662 A1 | 4/2013 | Epstein |
| 2013/0117254 A1 | 5/2013 | Manuel-Devadoss et al. |
| 2013/0254744 A1* | 9/2013 | Sahoo ................ G06F 8/71 |
| | | 717/123 |
| 2013/0326469 A1 | 12/2013 | Fox et al. |
| 2014/0040238 A1 | 2/2014 | Scott et al. |
| 2014/0075414 A1 | 3/2014 | Fox et al. |
| 2014/0122182 A1 | 5/2014 | Cherusseri et al. |
| 2014/0149894 A1 | 5/2014 | Watanabe et al. |
| 2014/0163959 A1 | 6/2014 | Hebert et al. |
| 2014/0188746 A1 | 7/2014 | Li |
| 2014/0297476 A1 | 10/2014 | Wang et al. |
| 2014/0331200 A1 | 11/2014 | Wadhwani et al. |
| 2014/0337355 A1 | 11/2014 | Heinze |
| 2015/0127567 A1 | 5/2015 | Menon et al. |
| 2015/0220608 A1 | 8/2015 | Crestani Campos et al. |
| 2015/0331866 A1 | 11/2015 | Shen et al. |
| 2015/0378692 A1 | 12/2015 | Dang et al. |
| 2016/0253688 A1 | 9/2016 | Nielsen et al. |
| 2016/0350105 A1 | 12/2016 | Kumar et al. |
| 2016/0378618 A1 | 12/2016 | Cmielowski et al. |
| 2017/0034023 A1 | 2/2017 | Nickolov et al. |
| 2017/0063776 A1 | 3/2017 | Nigul |
| 2017/0154543 A1* | 6/2017 | King .................. G09B 7/02 |
| 2017/0177318 A1 | 6/2017 | Mark et al. |
| 2017/0220633 A1 | 8/2017 | Porath et al. |
| 2017/0242892 A1 | 8/2017 | Ali et al. |
| 2017/0286541 A1 | 10/2017 | Mosley et al. |
| 2017/0286548 A1 | 10/2017 | De et al. |
| 2018/0046609 A1 | 2/2018 | Agarwal et al. |
| 2018/0067836 A1 | 3/2018 | Apkon et al. |
| 2018/0107983 A1 | 4/2018 | Tian et al. |
| 2018/0114000 A1 | 4/2018 | Taylor |
| 2018/0189055 A1* | 7/2018 | Dasgupta ............ G06F 11/3692 |
| 2018/0191599 A1 | 7/2018 | Balasubramanian et al. |
| 2018/0329883 A1 | 11/2018 | Leidner et al. |
| 2018/0349388 A1* | 12/2018 | Skiles ................ G06F 16/358 |
| 2019/0026106 A1 | 1/2019 | Burton et al. |
| 2019/0229998 A1 | 7/2019 | Cattoni |
| 2019/0278933 A1 | 9/2019 | Bendory et al. |
| 2019/0286683 A1 | 9/2019 | Kittur et al. |
| 2019/0294703 A1 | 9/2019 | Bolin et al. |
| 2019/0303141 A1 | 10/2019 | Li et al. |
| 2019/0311044 A1 | 10/2019 | Xu et al. |
| 2019/0324981 A1 | 10/2019 | Counts et al. |
| 2020/0097261 A1 | 3/2020 | Smith et al. |
| 2020/0110839 A1 | 4/2020 | Wang et al. |
| 2020/0125482 A1 | 4/2020 | Smith et al. |
| 2020/0133830 A1 | 4/2020 | Sharma et al. |
| 2020/0293354 A1 | 9/2020 | Song et al. |
| 2020/0301672 A1 | 9/2020 | Li et al. |
| 2020/0301908 A1 | 9/2020 | Frost et al. |
| 2020/0348929 A1 | 11/2020 | Sousa et al. |
| 2020/0356363 A1 | 11/2020 | Dewitt et al. |
| 2021/0049091 A1 | 2/2021 | Hikawa et al. |
| 2021/0065045 A1* | 3/2021 | Kummamuru ...... G06F 16/9038 |
| 2021/0073293 A1 | 3/2021 | Fenton et al. |
| 2021/0081189 A1 | 3/2021 | Nucci et al. |
| 2021/0081418 A1 | 3/2021 | Silveira et al. |
| 2021/0141863 A1 | 5/2021 | Wu et al. |
| 2021/0149658 A1 | 5/2021 | Cannon et al. |
| 2021/0149668 A1 | 5/2021 | Gupta et al. |
| 2021/0303989 A1 | 9/2021 | Bird et al. |
| 2021/0349801 A1 | 11/2021 | Rafey |
| 2021/0357210 A1 | 11/2021 | Clement et al. |
| 2021/0382712 A1 | 12/2021 | Richman et al. |
| 2021/0397418 A1 | 12/2021 | Nikumb et al. |
| 2021/0397546 A1 | 12/2021 | Cser et al. |
| 2022/0012297 A1 | 1/2022 | Basu et al. |
| 2022/0083577 A1 | 3/2022 | Yoshida et al. |

(56) References Cited

U.S. PATENT DOCUMENTS

2022/0107802 A1 4/2022 Rao et al.
2022/0215068 A1 7/2022 Kittur et al.
2023/0308700 A1 9/2023 Perez

FOREIGN PATENT DOCUMENTS

WO WO-2007/013418 A1 2/2007
WO WO-2020/086773 A1 4/2020

OTHER PUBLICATIONS

Lampropoulos et al., "REACT—A Process for Improving Open-Source Software Reuse", IEEE, pp. 251-254 (Year: 2018).
Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.
Schweik et al, Proceedings of the OSS 2011 Doctoral Consortium, Oct. 5, 2011, Salvador, Brazil, pp. 1-100, Http:/Avorks.bepress.com/charles_schweik/20 (Year: 2011).
Stanciulescu et al, "Forked and Integrated Variants in an Open-Source Firmware Project", IEEE, pp. 151-160 (Year: 2015).
Zaimi et al, ":An Empirical Study on the Reuse of Third-Party Libraries in Open-Source Software Development", ACM, pp. 1-8 (Year: 2015).
Iderli Souza, An Analysis of Automated Code Inspection Tools for PHP Available on Github Marketplace, Sep. 2021, pp. 10-17 (Year: 2021).
Khatri et al, "Validation of Patient Headache Care Education System (PHCES) Using a Software Reuse Reference Model", Journal of System Architecture, pp. 157-162 (Year: 2001).
Lotter et al, "Code Reuse in Stack Overflow and Popular Open Source Java Projects", IEEE, pp. 141-150 (Year: 2018).
Rothenberger et al, "Strategies for Software Reuse: A Principal Component Analysis of Reuse Practices", IEEE, pp. 825-837 (Year:2003).
Tung et al, "A Framework of Code Reuse in Open Source Software", ACM, pp. 1-6 (Year: 2014).
M. Squire, "Should We Move to Stack Overflow?" Measuring the Utility of Social Media for Developer Support, 2015 IEEE/ACM 37th IEEE International Conference on Software Engineering, Florence, Italy, 2015, pp. 219-228, doi: 10.1109/ICSE.2015.150. (Year: 2015).
S. Bayati, D. Parson, T. Sujsnjak and M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi: 10.1109/ICoICT.2015.7231398. (Year: 2015).
Andreas DAutovic, "Automatic Assessment of Software Documentation Quality", published by IEEE, ASE 2011, Lawrence, KS, USA, pp. 665-669, (Year: 2011).
S. Bayati, D. Parson, T. Susnjakand M. Heidary, "Big data analytics on large-scale socio-technical software engineering archives," 2015 3rd International Conference on Information and Communication Technology (ICoICT), Nusa Dua, Bali, Indonesia, 2015, pp. 65-69, doi: 1 0. 1109/ICoICT.2015.7231398. (Year: 2015).

* cited by examiner

METHODS AND SYSTEMS TO CLASSIFY SOFTWARE COMPONENTS BASED ON MULTIPLE INFORMATION SOURCES

CROSS-REFERENCE TO RELATED PATENT APPLICATION

This application claims the benefit of and priority to U.S. Provisional Patent Application No. 63/154,381 filed Feb. 26, 2021, the entire disclosure of which is incorporated by reference herein.

TECHNICAL FIELD

The present disclosure generally relates to methods and systems for classifying software components to different groups based on their relevance and catering to specific functions based on the information available on them. These category functions can be for different purposes including but not limited to business functions, technology stack functions and others.

BACKGROUND

There are more than 25 million open-source libraries, and the cloud API is rapidly growing, presenting a huge number of components for building today's applications. Understanding the spread of capabilities presented within these large numbers of components requires representing these components under a manageable number of categories. The abstraction of these components under different categories helps to organize the listings of these software components in a more structured way for different purposes like analysis, searching and browsing the lists to name a few.

Most of the software library components do not have a standardized categorization for them. Some of them are labelled by the authors which are not consistent with a reliable taxonomy nomenclature. Grouping the software components in a standard and consistent way will help in understanding the choices of available components in those specific categories. To visually represent these listings of software component will also bring a consistent expectation to the users on broad capability of the components.

When considering some of the systems and methods in the prior art, the above discussed drawbacks are evident. For example, United States Patent Application Publication Number 2010/0174670A1 discloses a pattern-based classification process that can use only very short patterns for classification and does not require a minimum support threshold. The training phase allows each training instance to "vote" for top-k, size-2 patterns, such as in a way that provides an effective balance between local, class, and global significance of patterns. Unlike certain approaches, the process need not make Boolean decisions on patterns that are shared across classes. Instead, these patterns can be concurrently added to all applicable classes and a power law-based weighing scheme can be applied to adjust their weights with respect to each class. However, the '670 publication describes data classification and hierarchical clustering based on patterns, but is silent on type and domain of data, data processing methods, scoring mechanism and ML techniques.

United States Patent Application Publication Number 2014/0163959A1 discloses an arrangement and corresponding method are described for multi-domain natural language processing. Multiple parallel domain pipelines are used for processing a natural language input. Each domain pipeline represents a different specific subject domain of related concepts. Each domain pipeline includes a mention module that processes the natural language input using natural language understanding (NLU) to determine a corresponding list of mentions, and an interpretation generator that receives the list of mentions and produces a rank-ordered domain output set of sentence-level interpretation candidates. A global evidence ranker receives the domain output sets from the domain pipelines and produces an overall rank-ordered final output set of sentence-level interpretations. However, the '959 publication describes multi-domain Natural language processing for sentence level interpretation but is silent about classification of software documents by hierarchically applying different techniques.

United States Patent Application Publication Number 2015/0127567A1 discloses a data mining system extracts job opening information and derives, for a given job, relevant competencies and derives, for a given candidate, relevant competencies, for the candidate. In some embodiments, the data mining performs authentication of relevant competencies before performing matching. The matching outputs can be used to provide data to a candidate indicating possible future competencies to obtain, to provide data to a teaching organization indicating possible future competencies to cover in their coursework, and to provide data to employers related to what those teaching organizations are covering. However, the '567 publication discloses processing of natural language for skilling and recruitment of human resources but is silent on classification and hierarchical representation of software documents.

U.S. Pat. No. 7,774,288 discloses records including category data that is clustered by representing the data as a plurality of clusters, and generating a hierarchy of clusters based on the clusters. Records including category data are classified into folders according to a predetermined entropic similarity condition. However, the '288 patent describes data classification and hierarchical clustering but is silent in terms of type and domain of data, data processing methods, scoring mechanism and ML techniques.

U.S. Pat. No. 8,838,606 discloses systems and methods for classifying electronic information or documents into a number of classes and subclasses are provided through an active learning algorithm. In certain embodiments, seed sets may be eliminated by merging relevance feedback and machine learning phases. Such document classification systems are easily scalable for large document collections, require less manpower and can be employed on a single computer, thus requiring fewer resources. Furthermore, the classification systems and methods can be used for any pattern recognition or classification effort in a wide variety of fields, including electronic discovery in legal proceedings. However, the '606 patent is silent on type and domain of data, data processing methods, scoring mechanism and ML techniques.

U.S. Pat. No. 9,471,559 discloses creating training data for a natural language processing system that includes obtaining natural language input, the natural language input annotated with one or more important phrases; and generating training instances including a syntactic parse tree of nodes representing elements of the natural language input augmented with the annotated important phrases. In another aspect, a classifier may be trained based on the generated training instances. The classifier may be used to predict one or more potential important phrases in a query. However, the '559 patent describes automatic generation of phrases to use in training of question answering system based on annotation but is silent on taxonomy of software documents.

In view of the above examples and the drawbacks described in each, there is a need for a method and a system that classifies the software components into a defined taxonomy structure. A method or system that uses the different information available in the software component documentation and source code to understand the semantic context of the purpose the software component.

SUMMARY

The following presents a simplified summary of the subject matter in order to provide a basic understanding of some of the aspects of subject matter embodiments. This summary is not an extensive overview of the subject matter. It is not intended to identify key/critical elements of the embodiments or to delineate the scope of the subject matter. Its sole purpose to present some concepts of the subject matter in a simplified form as a prelude to the more detailed description that is presented later.

The present disclosure provides an automated and consistent way to organizing these software components into different category dimensions to provide a structured way to browse them in an easier way for the users.

The present disclosure is a new software system which classifies the software components into a defined taxonomy structure. The system uses the different information available in the software component documentation and source code to understand the semantic context of the purpose the software component. The area of application of the software component is also understood by the system in different dimensions, for example, is this component serving a database interaction function or it can be further abstracted to level of serving a finance business function like payment gateway.

Therefore, a system for classifying software components is disclosed herein including at least one processor that operates under control of a stored program including a sequence of program instructions to control one or more components. The components including a Component Categories Portal, a Categorizer, a Classification ML Model builder, a Natural Language Processing (NLP) Cleanup Services, a NLP Extractor, a Clustering Service, a Classification Service, a Dictionary Rules Service, and a Category Ranking Service. The Component Categories Portal views the software components with their classification details and the Categorizer is in communication with the Component Categories Portal to create an overall ranked classification for the software components. The Classification ML Model builder is in communication with the Categorizer to create machine learning models based on the software components with training for prediction tasks and the NLP Cleanup Services is in communication with the Classification ML Model builder to extract needed and clean up sections of information associated with the software components. The NLP Extractor is in communication with the NLP Cleanup Services to extract key software entities based on the software components for classification and the Clustering Service is in communication with the NLP Extractor to group similar software components together. The Classification Service is in communication with the Clustering Services to classify the software components and the Dictionary Rules Service is in communication with the Classification Service to provide software dictionary terms and rules based on the software components for classification ranking. Finally, the Category Ranking Service in communication with the Dictionary Rules Service to compute final top ranked classifications for the software components.

In an embodiment, the Component Categories Portal is configured to view different categories for the software components and view the software components under a category. In an embodiment, the Categorizer is configured to invoke the Classification services to classify the software components, classify the software components based on different information collected and techniques, and apply the techniques including document classification, clustering and entity mapping to classify the software components. In an embodiment, the Classification ML Model builder is configured to create the machine learning models for classifying the software components based on different information sources, train a plurality of models with data extracted from the documentation, code, and model services are provided to classify based on entity extraction, clustering and document classification techniques.

In an embodiment, the NLP Cleanup Services is configured to provide natural language processing services for removing unnecessary information from the extracted data. In an embodiment, the NLP Extractor is configured to provide natural language processing services to extract key software entities from the information collected based on the software components and train the plurality of models based on the software dictionary and the software component information. In an embodiment, the Clustering Services is configured to collect all the software component information and group the software component information into clusters having similar software components, and extract key definition terms from a cluster documentation associated with the clusters and other information collected earlier.

In an embodiment, the Classification Service is configured to predict a category of the software components classification based on the cluster documentation extracted from the software components and apply a threshold-based mechanism to report top categories of software components classification with corresponding confidence scores. In an embodiment, the Dictionary Rules Service is configured to provide the rules for ranking the classifications based on different parameters of project source code metrics and documentation maturity level and provide key software dictionary terms for the categories.

In an embodiment, the Category Ranking Service is configured to fetch the different classifications for the software components done with different services, evaluate classification scores based on the project source code metrics, evaluate the classification score based on the documentation maturity level, and apply rules and normalize score based on the classification scores to rank the classification scores. In an embodiment, the Repo Services is configured to provide integration services for connecting to Project Repository, enable to retrieve source code of the software component and software component documentations, and save the software component information, the retrieved source code and the software component documentations to a database and file store.

A method associated with a system to classify software components into different categories is disclosed. Here, at least one processor that operates under control of a stored program including a sequence of program instructions. A first instruction step including collecting different sources of information about the software components. A second instruction step including extracting required sections of the software component information from a software component documentation and a source code associated with the software component. A third instruction step including preprocessing the extracted software component information using natural language processing techniques. A fourth instruction step including fetching dictionary for classification and rules associated with the classification. A fifth instruction step including running a categorization process on the software components. A sixth instruction step including ranking the different categorization identified for the software components.

One implementation of the present disclosure is a system for classifying software components based on multiple information sources. The system includes one or more processors and memory storing instructions that, when executed by the one or more processors, cause the one or more processors to perform operations. The operations include retrieving a number of sources including a project documentation file, source code, and dependent project list associated with a software component, extracting a number of entities from the number of sources, processing the number of entities based on a machine learning model, mapping the number of entities to a set of rules, generating a number of categorizations based on the mapping of the number of entities to the set of rules, and ranking the number of categorizations based on the set of rules.

In some embodiment, the machine learning model uses natural language processing techniques for removing unnecessary information including hyperlinks, stopwords, and version information.

In some embodiments, the machine learning model is generated based on training data extracted from a number of project documentation files associated with the dependent project list.

In some embodiments, generating the number of categorizations includes providing a first categorization associated with a direct match between one or more entities of the number of entities with the set of rules and providing a second categorization associated with an indirect match between the one or more entities of the number of entities and the set of rules, the indirect match associated with a similarity score, the similarity score identified as equal to or greater than a threshold score.

In some embodiments, one or more of the entities are identified as at least one of a short description, a full description, features, code comments, project tags, and dependent libraries.

In some embodiments, ranking the number of categorizations based on the set of rules includes determining whether a categorization matches a name of the project documentation file.

In some embodiments, the operations further including presenting a user with the ranked categorizations.

Another implementation of the present disclosure is a method for classifying software components based on multiple information sources. The method includes retrieving a number of sources including a project documentation file, source code, and dependent project list associated with a software component, extracting a number of entities from the number of sources, processing the number of entities based on a machine learning model, mapping the number of entities to a set of rules, generating a number of categorizations based on the mapping of the number of entities to the set of rules, and ranking the number of categorizations based on the set of rules.

In some embodiments, the method includes presenting a user with the ranked categorizations.

Another implementation of the present disclosure is one or more non-transitory computer-readable media for classifying software components based on multiple information sources. The non-transitory computer-readable media store instructions thereon. The instructions, when executed by one or more processors, cause the one or more processors to retrieve a number of sources including a project documentation file, source code, and dependent project list associated with a software component, extract a number of entities from the number of sources, process the number of entities based on a machine learning model, map the number of entities to a set of rules, generate a number of categorizations based on the mapping of the number of entities to the set of rules, and rank the number of categorizations based on the set of rules.

BRIEF DESCRIPTION OF THE DRAWINGS

The following drawings are illustrative of particular examples for enabling systems and methods of the present disclosure, are descriptive of some of the methods and mechanism, and are not intended to limit the scope of the present disclosure. The drawings are not to scale (unless so stated) and are intended for use in conjunction with the explanations in the following detailed description.

Like reference numbers and designations in the various drawings indicate like elements.

Persons skilled in the art will appreciate that elements in the figures are illustrated for simplicity and clarity and may represent both hardware and software components of the system. Further, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

Exemplary embodiments now will be described. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

Figure 1:
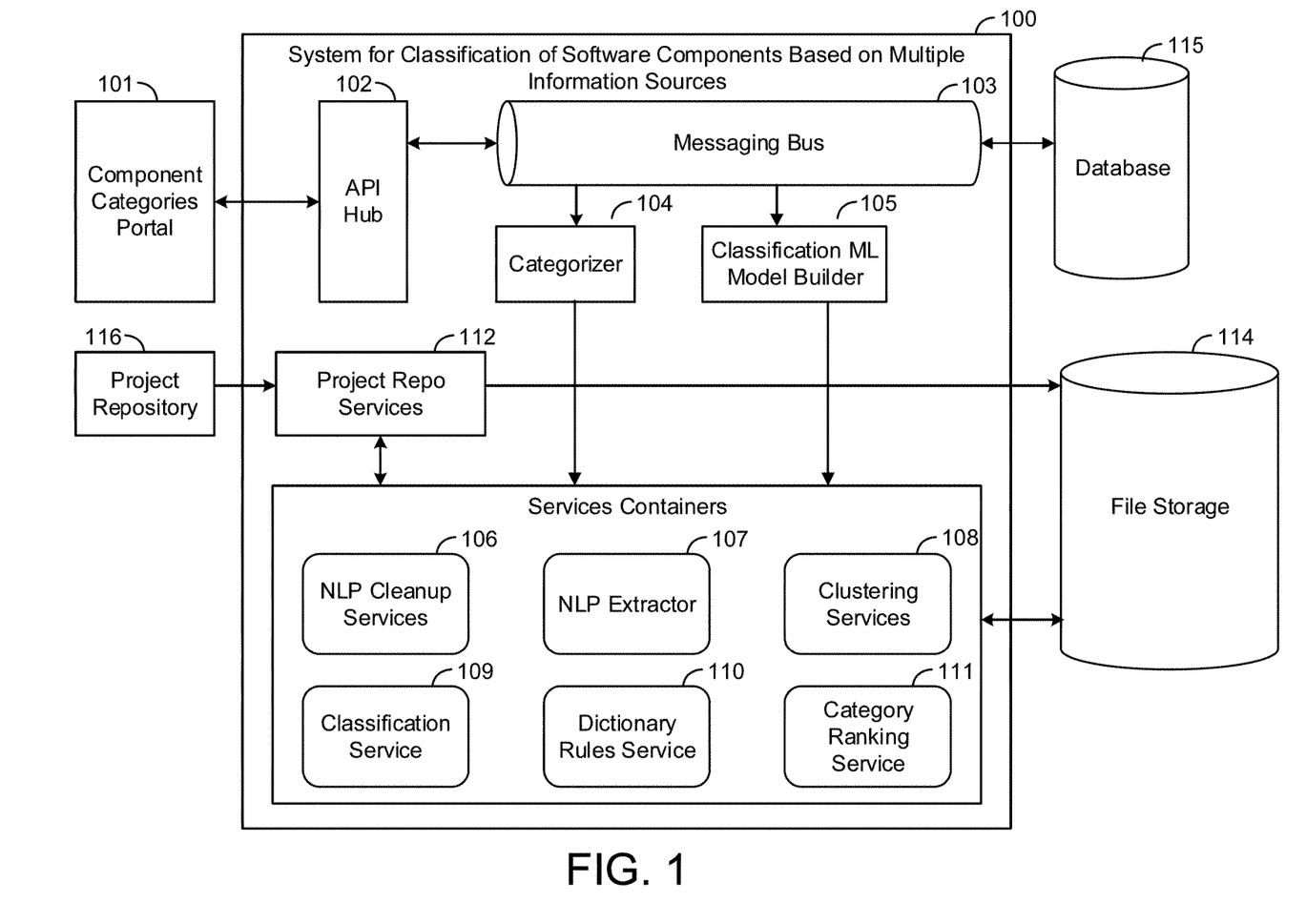
FIG. 1 shows a system architecture that does the classification of software components, according to some embodiments.

FIG. 1 shows a System 100 or a high-level architecture that does classification of software components. Briefly, and as described in further detail below, the System 100 includes an API Hub 102, Messaging Bus 103, Categorizer 104, Classification ML Model builder 105, Natural Language Processing (NLP) Cleanup Services 106, NLP Extractor 107, Clustering Service 108, Classification Service 109, Dictionary Rules Service 110, Category Ranking Service 111, Project Repo Services 112, File Storage 114, Database 115 and Component Categories Portal 101, which are a unique set of software components to perform the task of classifying the software.

In some embodiments, the primary functional block of the present disclosure includes the Component Categories Portal 101 which has a User Interface for the user to view the different categories available for the software components with their classification details. The user can explore the software components under the categories as a list of software components for that category.

In some embodiments, the Categorizer 104 in communication with the Component Categories Portal 101 and is responsible for the overall ranked classification of the software components. The Categorizer 104 invokes the services to classify the software components on multiple dimensions of information sources and techniques used. The Categorizer 104 classifies the software components based on different information collected and techniques. The techniques used are but not limited to techniques of document classification, clustering and entity mapping to classify the software components.

In some embodiments, the Classification ML Model builder 105 is responsible for creating the machine learning models for classifying the software components based on the different information sources with training for prediction tasks. The Classification ML Model builder 105 trains multiple models with data extracted from the documentation, code, etc., and provides for multiple Model services to classify based on entity extraction, clustering and document classification techniques.

In some embodiments, the Natural Language Processing (NLP) Cleanup Services 106 is in communication with the Classification ML Model builder 105 to extract needed and clean up sections of information associated with the software component, or in other words, provides natural language processing services for removing the unnecessary information from the extracted content. Key technology related words are retained by using a special dictionary of software technology terms during the cleanup process.

In some embodiments, the NLP Extractor 107 is in communication with the NLP Cleanup Services 106 to extract key software entities based on the software components for classification. Hence, the NLP Extractor 107 uses natural language processing services to extract key software entities from the collected software component information. The trained models that are based on software dictionary and collected software component information is used with natural language processing to extract the information.

In some embodiments, the Clustering Service 108 is in communication with the NLP Extractor 107 to group similar software components together. The Clustering Service 108 takes all the software component information and groups them into clusters having similar software components using the machine learning services and trained models. The Clustering Service 108 then extracts key definition terms from the cluster documentation associated with the clusters and other information collected earlier aided by the software technology terms dictionary.

In some embodiments, the Classification Service 109 is in communication with the Clustering Service 108 to classify the software components. The Classification Service 109 is used to predict the category of the software components classification based on the cluster documentation extracted from the Classification Service 109. The Classification Service 109 applies a threshold-based mechanism to report top categories of software components classification with their confidence scores from classification done utilizing the trained models with existing labelled content with the categories.

In some embodiments, the Dictionary Rules Service 110 is in communication with the Classification Service 109 provides software dictionary terms and rules based on the software components for classification ranking. The Dictionary Rules Service 110 provides the different rules for ranking the classifications based on different parameters of project source code metrics and documentation maturity level. The Dictionary Rules Service 110 provides the key software dictionary terms for categories.

In some embodiments, the Category Ranking Service 111 is in communication with the Dictionary Rules Service to compute final top ranked classifications for the software components. The Category Ranking Service 111 fetches the different classification for the software components done with different services. The Category Ranking Service 111 then evaluates the classification score based on the project source code metrics. The Category Ranking Service 111 evaluates the classification score based on the documentation maturity level. The Category Ranking Service 111 applies rules to and normalizes score based on all the classification scores to rank the classification scores.

In some embodiments, the Repo Services 112 provides integration services for connecting to Project Repository 116. This enables the System 100 to get the source code of software component and software component documentations. After fetching this information, the Repo Services 112 saves the software component information, source code and documentations to the database and file store.

Figure 2:
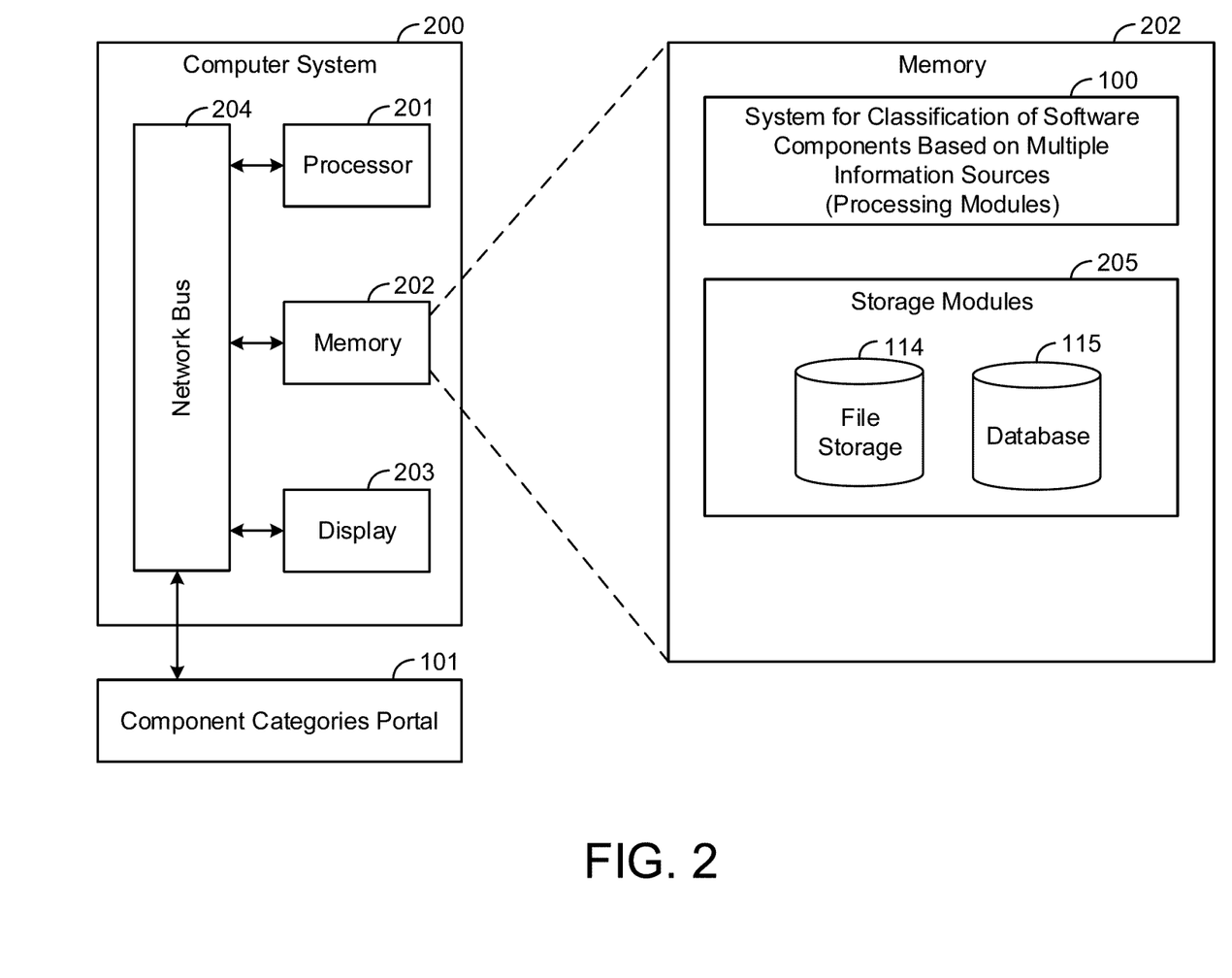
FIG. 2 shows an example computer system implementation for classifying the software projects, according to some embodiments.

FIG. 2 shows a block view of a System 200 configured for classifying software components, according to some embodiments. This may include a Processor 201, Memory 202, Display 203, Network Bus 204, and other input/output like a mic, speaker, wireless card etc. The Software Component Classification System Modules 100, file storage 114, database 115, are stored in a Partition 205 of the Memory 202 which provides the necessary machine instructions to the Processor 201 to perform the executions for classifying the software components. In some embodiments, the Processor 201 controls the overall operation of the System 100 and managing the communication between the software components through the network bus 204. The Memory 202 holds the software component classification system code, data and instructions of the System 100 and may be of different types of the non-volatile memory and volatile memory. The software component categories portal 101 interacts with the network bus 204.

Figure 3:
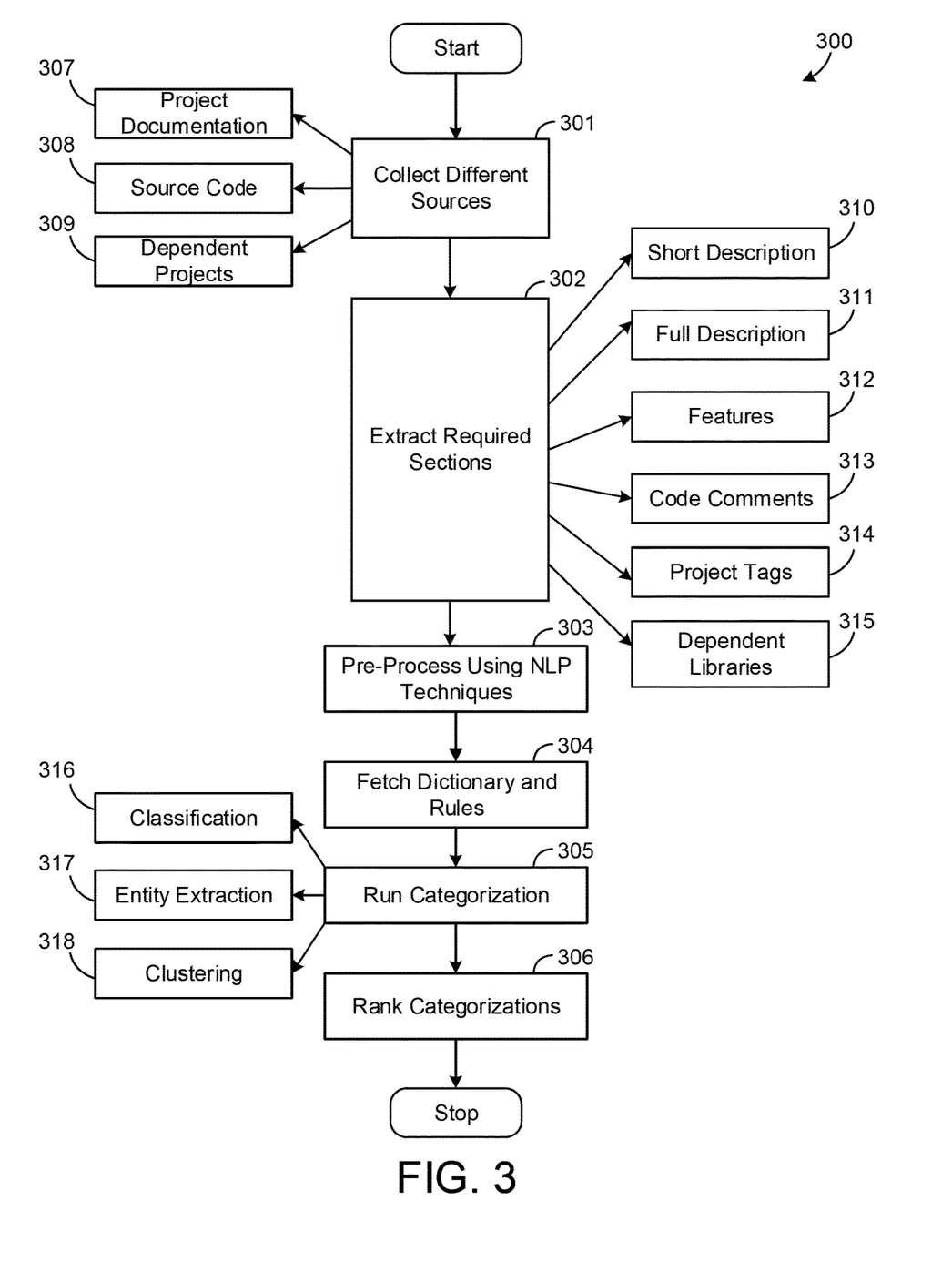
FIG. 3 shows the overall process flow to classify the software components into different categories, according to some embodiments.

FIG. 3 shows the end-to-end process 300 for classifying the software components, according to some embodiments. In step 301, The System 100 collects different sources of information about the software component, including Project Documentation 307, Source Code 308, and Dependent Projects 309. The System 100 connects to the source code repository (e.g., Project Repository 116) and documentation site and downloads the source code and documentation. The System 100 then collects the dependent projects details.

In some embodiments, in step 302, the Source Code 308 is parsed and code comments are collected. Then the documentation is analysed to extract the contextual sections for the software component. The information sections include but are not limited to Short Description 310, Full description 311, Features 312, Code Comments 313, Project Tags 314, Dependent Libraries 315, and Release notes (not shown). Below is a sample output from step 302:

```
{
    "fullName": "spring-projects/spring-boot",
    "description": "Spring Boot",
    "topics": ["java", "spring-boot", "spring", "framework"],
    "readme": "Spring Boot helps you to create Spring-powered, production-grade
    applications and services with absolute minimum fuss. It takes an opinionated
    view of the Spring platform so that new and existing users can quickly get to the
    bits they need. You can use Spring Boot to create stand-alone Java applications
    that can be started using java -jar or more traditional WAR deployments. We also
    provide a command line tool that runs spring scripts. Provide a radically faster
    and widely accessible getting started experience for all Spring development Be
    opinionated out of the box, but get out of the way quickly as requirements start to
    diverge from the defaults Provide a range of non-functional features that are
    common to large classes of projects (e.g. embedded servers, security, metrics,
    health checks, externalized configuration) Absolutely no code generation and no
    requirement for XML configuration "
}
```

In some embodiments, Process 300 further includes steps 303, 304, 305, and 306, described in further detail below in regards to FIGS. 4-7.

Figure 4:
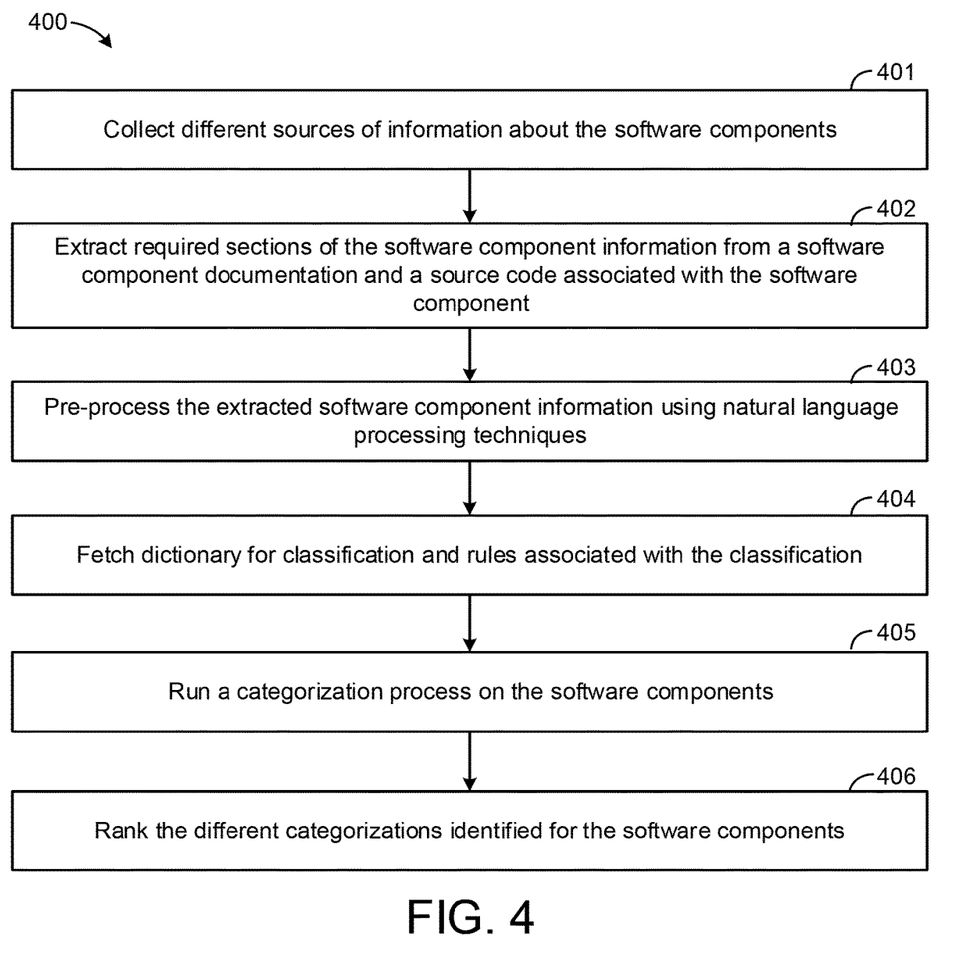
FIG. 4 shows the overall method flow associated with a computer programmed product to classify the software components into different categories, as described in FIGS. 1-3, according to some embodiments.

FIG. 4 illustrates a process 400 associated with a computer programmed product to classify the software components into different categories, as described in FIGS. 1-3, according to some embodiments. Process 400 can be performed by the components of System 100 or System 200 in some embodiments. Here, at least one processor that operates under control of a stored program includes a sequence of program instructions. Step 401 includes collecting different sources of information about the software components. Step 402 includes extracting required sections of the software component information from a software component documentation and a source code associated with the software component. Step 403 includes pre-processing the extracted software component information using natural language processing techniques. Step 404 includes fetching dictionary for classification and rules associated with the classification. Step 405 includes running a categorization process on the software components. Step 406 includes ranking the different categorization identified for the software components.

Figure 5:
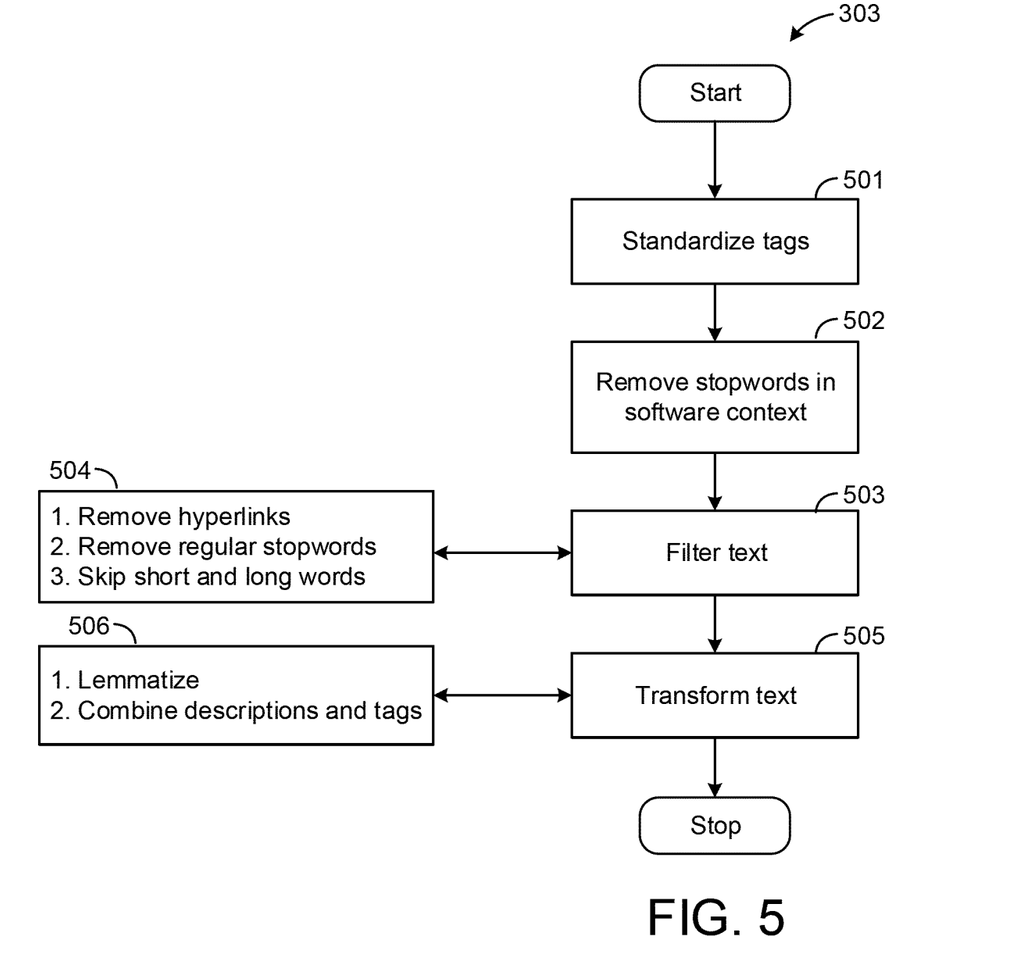
FIG. 5 shows Pre-Process using NLP techniques, where the topics of documents are standardised in the Standardise tags, according to some embodiments.

Referring to FIG. 5, step 303 introduced above in regards to FIG. 3 is described in further detail, according to some embodiments. FIG. 5 and step 303 relate to pre-processing the documents using NLP techniques. The topics of documents are standardised in step 501. In step 502, learnt stopwords in software context are removed. In step 503 the document is further filtered by applying natural language processing techniques for removing, as shown in block 504, unnecessary information, for example, hyperlinks, regular stopwords, version information, and skipping words that are too short or too long in the context. In step 505, the words in the document are lemmatised, as shown in block 506, and features of a software document like description and tags are combined. Following steps 501, 502, 503, and 505 the section headings and the section content are verified using the NLP techniques as shown in regards to step 303. Any sections without headings are mapped using the NLP techniques to a heading using natural processing techniques trained with earlier provided documentation and section headings. The NLP techniques are used to clean up the section content by removing unnecessary information. A sample output of step 303 is shown below:

```
{
    'repo_name':'spring-projects/spring-boot'
    'combined_text':'spring boot spring boot help spring powered production grade
    application service absolute minimum fuss take opinionated view spring exist user
    get bit need spring boot stand alone java application start use java jar traditional
    war deployment command line run spring script radically fast widely accessible
    get start experience spring opinionate box get requirement start diverge default
    range non functional feature common large class project embed server security
    metric health check externalize configuration absolutely code generation
    requirement xml configuration spring framework spring boot'
    'label':'spring frameworks spring-boot'
    'readme_length':140
    'preprocessed_text_length':82
    'number_of_tags':3
    'topics':'spring frameworks spring-boot'
}
```

Figure 6:
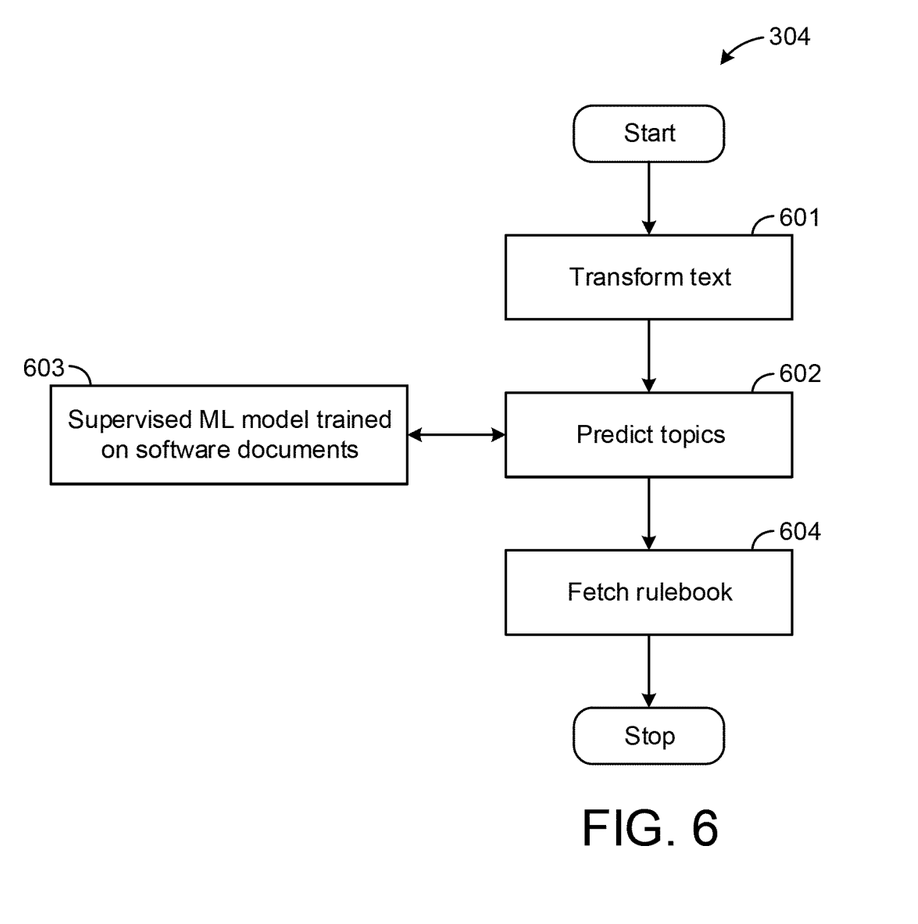
FIG. 6 shows Fetch Dictionary and Rules step, where the transformed document from the Pre-process using NLP techniques step are fed to Predict topics, which leverages supervised Machine learning model, according to some embodiments.

Referring to FIG. 6, step 304 introduced above in regards to FIG. 3 is described in further detail, according to some embodiments. FIG. 6 and step 304 relate to fetching a dictionary and rules. In step 601, the output of step 303 is received as transformed text. In step 602 a supervised Machine learning model (shown in block 603) trained specifically on software related documents is leveraged for prediction of number of topics that defaults to 10 unless specified otherwise. In step 604, a rule book that was generated as a result of another training process that represents technical words in multi-dimensional vector space is fetched. Following steps 601, 602, and 604, the software dictionary terms and priority rules associated with the software components are loaded as shown in regards to step 304. The rules for prioritizing the classification results based on the source of information and project source code metrics, documentation quality is loaded, or in other words, the rules are loaded to be used while classifying and ranking the software components. A sample output of step 304 is shown below:

'predicted_topics': {'spring-boot', 'spring', 'spring-mvc'}

Figure 7:
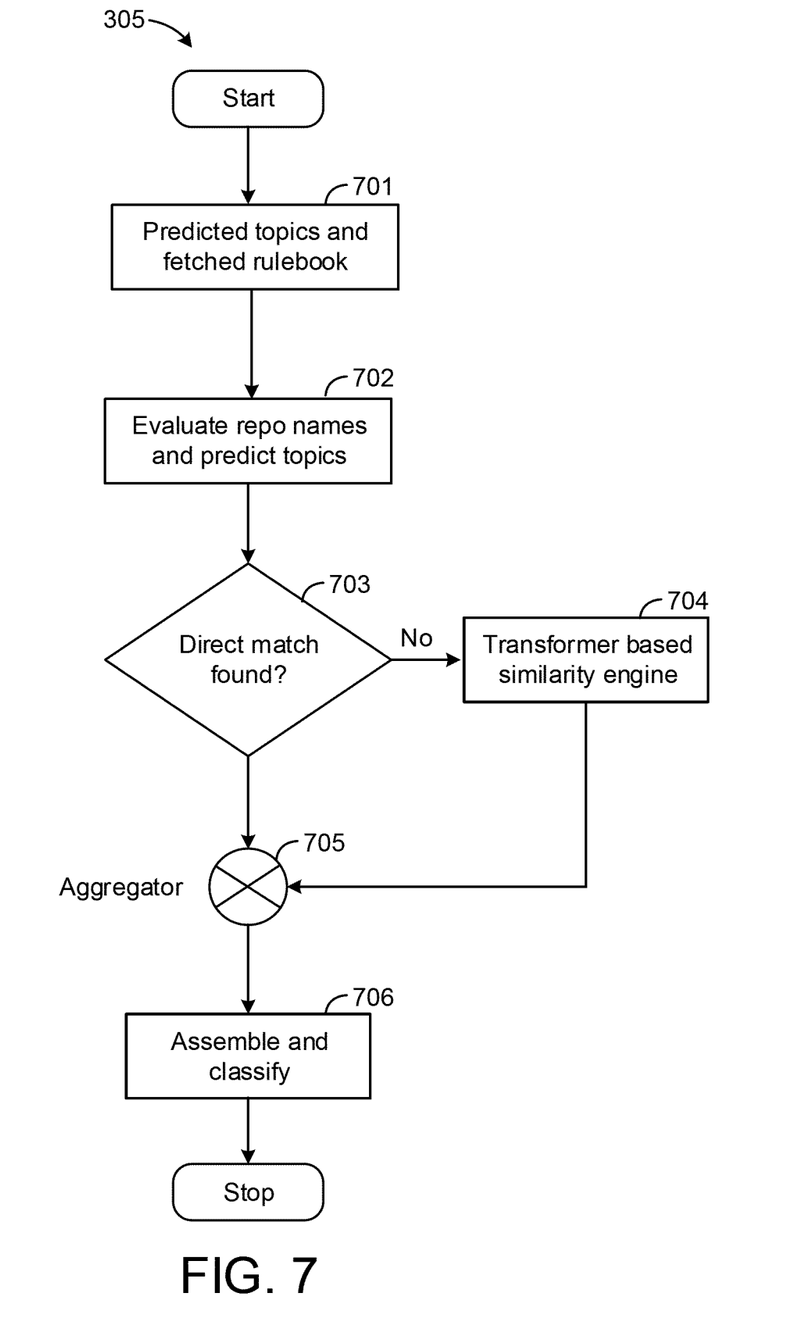
FIG. 7 shows how predicted topics are evaluated against the name of software document and a weight being assigned accordingly, according to some embodiments.

Referring to FIG. 7, step 305 introduced above in regards to FIG. 3 is described in further detail, according to some embodiments. FIG. 7 and step 305 relate to categorization. Generally, in step 305, the System 100 applies machine learning and natural language tasks to the various information extracted and cleaned in the earlier steps. The System 100 then applies classifying techniques on the extracted and consolidated information to predict the category for the software components. Accordingly, step 305 may include steps shown as Classification 305, Entity Extraction 317, and Clustering 318. In step 701, the output of step 304 is received as predicted topics and a fetched rulebook. In step 702 the predicted topics are evaluated against the name of software document and a weight is assigned if they are equal. In step 703, the predicted topics are looked up in the rule book by applying clustering techniques to find if there are any direct match that is found in the rule book. If a direct match is found, they are stored in memory for computation in further steps. If a direct match is not found in step 704 the rule book is again looked up for any indirect match from the result of similarity engine and accordingly another weight is assigned for score computation. Based on the result of the step 703, step 704 will be executed and therefore the output is aggregated for an input for step 706 in the step 705. In step 706, the classification results are grouped hierarchically. For every repetitive hierarchical group, the scoring is continually boosted to find the hierarchical pair that has scored the maximum. A sample output of step 305 is shown below:

```
{
  0:[['', 'application-framework', 'server', 'spring-boot', 'direct_match', True], ['1317', 'application-framework', 'server', 'spring-boot', 'direct_match', True]]
  1:[['', 'application-framework', 'server', 'spring', 'direct_match', False], ['787', 'application-framework', 'server', 'spring', 'direct_match', False]]
  2:['197', 'mvc', 'architecture','', 'direct_match', False]
}
```

In regards to the sample output of step 305, for every predicted topic, the respective finds from rule book are displayed above. The first value of array contains index from rule book, the second value is a subcategory of software document under test, the third value is a category of software document under test, the fourth value indicates it will be considered as a technical label of the software document under test, the fifth value indicates whether the match from rule book is a direct match or not, and the sixth value indicates whether name of the software document under test matches with the predicted topic or not.

Referring again to FIG. 3, in the Rank Categorizations 306 step, the different categorization identified for the software component is ranked with normalized scores, according to some embodiments. The prediction score of different categorizations done for the software component is evaluated with the rules for boosting the prediction score based on the software component information state of maturity. The rules for normalizing the scores across different categorization is then applied depending on the extracted information metrics and project source code metrics. The boosted and normalized prediction scores is then used to rank the categories for the software component. A sample output of step 306 is shown below:

```
{
"technologyCategoryDetails": [
    'category':'architecture '
    'subCategoryCode':'mvc'
    'categoryCode':'architecture'
    'subCategory':'mvc'
    'rank':1
    'createdDate':'2022-02-08T16:10:30Z'
    'probability':0.1038
]
    'techLabels':['spring-boot', 'spring']
    'primaryTechCategory':'architecture'
    'primaryTechSubcategory':'mvc'
    'primaryTechProbability':0.10375863313674927
}
```

In regards to the sample output of step 306, the key technologyCategoryDetails contains all the possible categories in array view. The example here contains only one category along with computed rank. The concluded labels, the category, the subcategory and the probability of classification are found against keys techLabels, primaryTechCategory, primaryTechSubcategory, and primaryTechProbability respectively.

As will be appreciated by one of skill in the art, the present disclosure may be embodied as a method and system. Accordingly, the present disclosure may take the form of an entirely hardware embodiment, a software embodiment or an embodiment combining software and hardware aspects. It will be understood that the functions of any of the units as described above can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts performed by any of the units as described above.

Instructions may also be stored in a computer-readable memory that can direct a computer or other programmable data processing apparatus to function in a particular manner, such that the instructions stored in the computer-readable memory produce an article of manufacture including instruction means which implement the function/act performed by any of the units as described above.

Instructions may also be loaded onto a computer or other programmable data processing apparatus like a scanner/ check scanner to cause a series of operational steps to be performed on the computer or other programmable apparatus to produce a computer implemented process such that the instructions which execute on the computer or other programmable apparatus provide steps for implementing the functions/acts performed by any of the units as described above.

In the specification, there has been disclosed exemplary embodiments of the present disclosure. Although specific terms are employed, they are used in a generic and descriptive sense only and not for purposes of limitation of the scope of the present disclosure.

What is claimed is:

1. A method for classifying software components based on multiple information sources, the method comprising:
    retrieving a plurality of sources comprising a project documentation file, source code, and dependent project list associated with a software component;
    extracting contextual information for the software component from the plurality of sources;
    pre-processing the contextual information using natural language processing;
    fetching, based on the pre-processed contextual information, a set of rules for prioritizing classification results;
    generating a plurality of categorizations for the software component using the pre-processed contextual information; and
    ranking the plurality of categorizations for the software component based on the set of rules
    wherein:
        generating the plurality of categorizations comprises providing a first categorization associated with a direct match between contextual information and the set of rules and providing a second categorization associated with an indirect match between the contextual information and the set of rules, the indirect match associated with a similarity score, the similarity score identified as equal to or greater than a threshold score; and
        the contextual information comprises a short description, a full description, features, code comments, project tags, and dependent libraries.

2. The method of claim 1, wherein pre-processing the contextual information using natural language processing comprises removing hyperlinks, stopwords, and version information.

3. The method of claim 1, wherein the natural language processing uses a machine learning model, the method comprising training the machine learning model using training data extracted from a plurality of project documentation files associated with the dependent project list.

4. The method of claim 1, wherein ranking the plurality of categorizations based on the set of rules comprises determining whether a categorization matches a name of the project documentation file.

5. The method of claim 1, further comprising presenting a user with the ranked categorizations.

6. A system for classifying software components based on multiple information sources, the system comprising:
    one or more processors and memory storing instructions that, when executed by the one or more processors, cause the one or more processors to perform operations comprising:
        retrieving a plurality of sources comprising a project documentation file, source code, and dependent project list associated with a software component;
        extracting contextual information for the software component from the plurality of sources;
        pre-processing the contextual information using natural language processing;
        fetching, based on the pre-processed contextual information, a set of rules for prioritizing classification results;
        generating a plurality of categorizations for the software component using the pre-processed contextual information; and
        ranking the plurality of categorizations for the software component based on the set of rules
        wherein:
            generating the plurality of categorizations comprises providing a first categorization associated with a direct match between contextual information and the set of rules and providing a second categorization associated with an indirect match between the contextual information and the set of rules, the indirect match associated with a similarity score, the similarity score identified as equal to or greater than a threshold score; and
            the contextual information comprises a short description, a full description, features, code comments, project tags, and dependent libraries.

7. The system of claim 6, wherein pre-preprocessing the contextual information using the natural language processing comprises removing unnecessary information comprising hyperlinks, stopwords, and version information.

8. The system of claim 6, wherein the natural language processing uses a machine learning model generated based on training data extracted from a plurality of project documentation files associated with the dependent project list.

9. The system of claim 6, wherein ranking the plurality of categorizations based on the set of rules comprises determining whether a categorization matches a name of the project documentation file.

10. The system of claim 6, the operations further comprising presenting a user with the ranked categorizations.

11. One or more non-transitory computer-readable media for classifying software components based on multiple information sources, the non-transitory computer-readable media storing instructions thereon, wherein the instructions when executed by one or more processors cause the one or more processors to:
    retrieve a plurality of sources comprising a project documentation file, source code, and dependent project list associated with a software component;
    extract contextual information for the software component from the plurality of sources, wherein the contextual information comprises a short description, a full description, features, code comments, project tags, and dependent libraries;
    pre-process the contextual information using natural language processing;
    fetch, based on the pre-processed contextual information, a set of rules for prioritizing classification results;
    generate a plurality of categorizations for the software component using the pre-processed contextual information by providing a first categorization associated with a direct match between the contextual information and the set of rules and providing a second categorization associated with an indirect match between the contextual information and the set of rules, the indirect match associated with a similarity score, the similarity score identified as equal to or greater than a threshold score; and
    rank the plurality of categorizations for the software component based on the set of rules.

12. The non-transitory computer-readable media of claim 11, wherein pre-processing the contextual information using the natural language processing comprises removing hyperlinks.

13. The non-transitory computer-readable media of claim 11, wherein the natural language processing uses a machine learning model generated based on training data extracted from a plurality of project documentation files associated with the dependent project list.

14. The non-transitory computer-readable media of claim 11, wherein ranking the plurality of categorizations based on the set of rules comprises determining whether a categorization matches a name of the project documentation file.

\* \* \* \* \*